United States Patent [19]
Haramaty et al.

[11] Patent Number: 5,406,502
[45] Date of Patent: Apr. 11, 1995

[54] SYSTEM AND METHOD FOR MEASURING THE OPERATION OF A DEVICE

[75] Inventors: Yoav Haramaty; Daniel R. Lewin, both of Haifa, Israel

[73] Assignee: Elbit Ltd., Haifa, Israel

[21] Appl. No.: 84,687

[22] Filed: Jun. 29, 1993

[51] Int. Cl.$^6$ .............................................. G01B 7/00
[52] U.S. Cl. .............................. 364/551.01; 364/550; 395/906; 395/914
[58] Field of Search ................... 364/551.01, 550, 184, 364/580; 395/906, 907, 914, 915, 575; 324/248; 356/436

[56] References Cited

U.S. PATENT DOCUMENTS

| | | | |
|---|---|---|---|
| 4,644,479 | 2/1987 | Kemper et al. | 395/915 |
| 4,867,571 | 9/1989 | Frick et al. | 356/436 |
| 4,967,337 | 10/1990 | English et al. | 364/184 |
| 5,122,976 | 6/1992 | Bellows et al. | 364/580 |
| 5,167,010 | 11/1992 | Elm et al. | 395/915 |
| 5,210,704 | 5/1993 | Husseiny | 364/551.01 |
| 5,214,577 | 5/1993 | Sztipanovits et al. | 364/551.01 |
| 5,223,207 | 6/1993 | Gross et al. | 395/915 |
| 5,269,325 | 12/1993 | Robinson et al. | 324/248 |

FOREIGN PATENT DOCUMENTS

| | | |
|---|---|---|
| 20134935 | 3/1985 | European Pat. Off. . |
| 10208997 | 1/1987 | European Pat. Off. . |

OTHER PUBLICATIONS

"Empirical Models for Intelligent Data Validation", Halliburton NUS Environmental Corporation of Idaho Falls.

John F. MacGregor et al., "Multivariate Statistical Methods in Process Analysis and Control", Fourth International Conference on Chemical Process Control, South Padre Island, Tex., 1991.

W. H. Press et al., Numerical Recipes, Cambridge University Press, 1986, Chapter 11, pp. 350–363.

Syed et al., "Real–Time Monitoring and Diagnostics of Robotic Assembly With Self-Organizing Neural Maps", *Proceedings of the Real–Time Systems Symposium*, Arizona, 2–4 Dec. 1992, pp. 271–274.

Norwicki et al., "Evaluation of Vibroacoustic Diagnostic Symptoms by Means of the Rough Sets Theory", *Computers In Industry*, vol. 20, No. 2, Aug. 1992, Amsterdam, pp. 141–152.

Katsushige et al., "A Successful Preventive Maintenance Program for an Electric Power Plant", *Proceedings of the Annual Reliability and Maintainability Symposium*, Georgia, 25–28 Jan., 1993, Georgia, pp. 146–153.

Viswanadham et al., "Fault Detection and Diagnosis of Automated Manufacturing Systems", *Proceedings of the 27th Conference on Decision and Control*, Texas, 7–9 Dec. 1988, pp. 2301–2306.

Freyermuth, "An Approach to Model Based Fault Diagnosis of Industrial Robots", *Proceedings of the 1991 IEEE International Conference on Robotics and Automation*, Apr., 1991, California, pp. 1350–1356.

Manivannan et al., "Towards a Real–Time Knowledge-based Simulation System for Diagnosing Machine Tool Failure", *Proceedings of the 1990 Winter Simulation Conference*, 9–12 Dec., 1990, Lousiana, pp. 603–608.

Primary Examiner—Emanuel T. Voeltz
Assistant Examiner—Hal D. Wachsman
Attorney, Agent, or Firm—Skjerven, Morrill, MacPherson, Franklin & Friel; Forrest E. Gunnison

[57] ABSTRACT

A system and method for measuring the operation of a device is disclosed. A plurality of virtual sensors which define a multi-dimensional virtual sensor space sense the operation of the device. A normal operation determiner determines at least one region of normal operation for the device. An abnormal condition determiner provides a warning when the operation does not fall within the normal operation region which is defined within the multi-dimensional virtual sensor space. A maintenance method and system are also disclosed for maintaining at least one device. The maintenance system includes a measurement system and an abnormality processor. The measurement system measures the operation of the device and provides an indication of when the device is not operating normally. The abnormality processor predicts, based on the output of the measurement system, when the device is likely to fail.

24 Claims, 4 Drawing Sheets

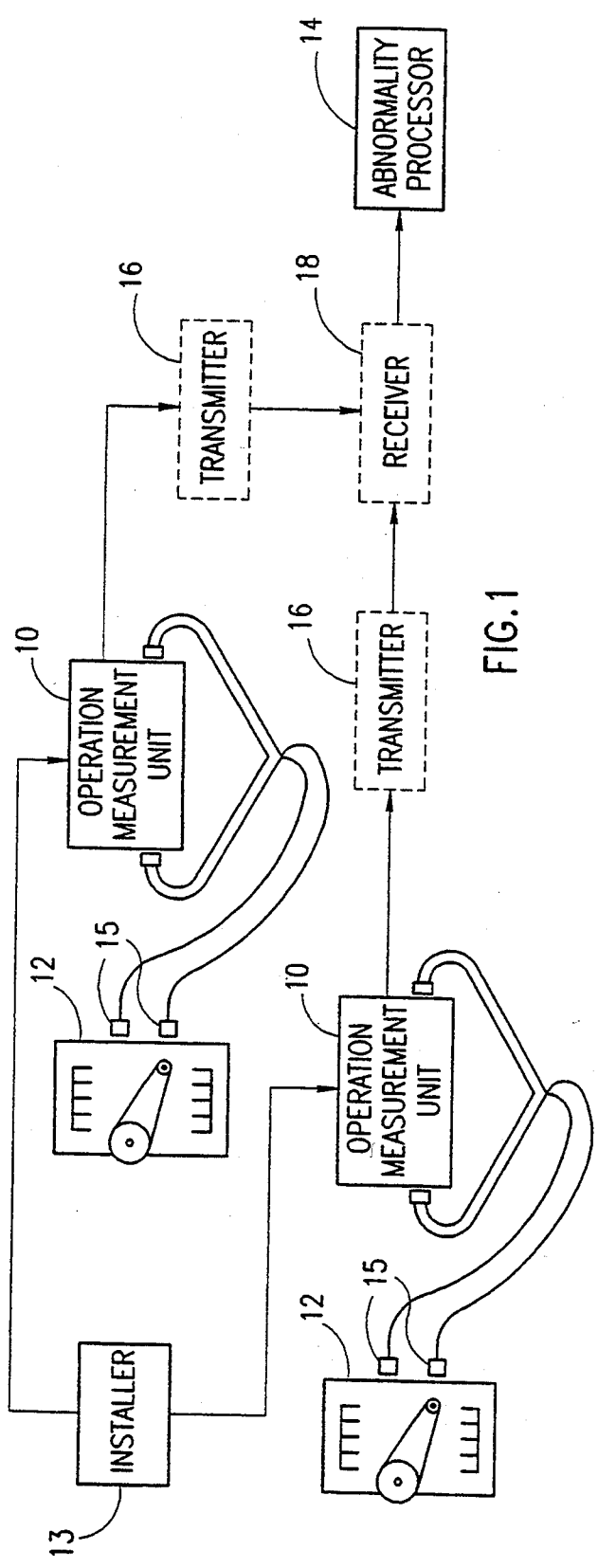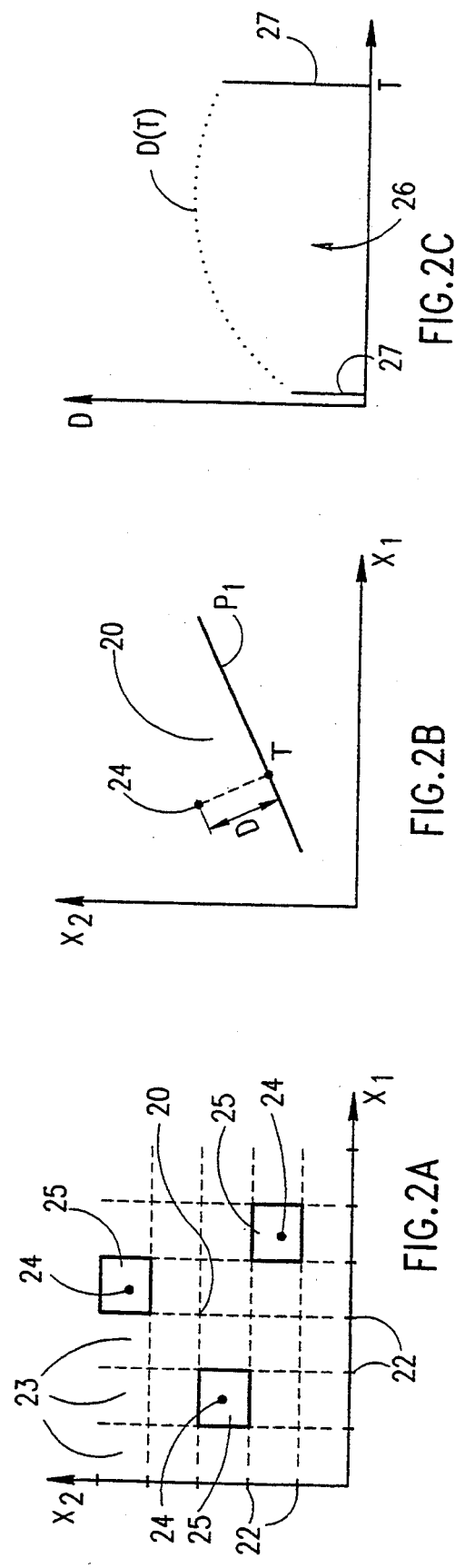

SYSTEM AND METHOD FOR MEASURING THE OPERATION OF A DEVICE

FIELD OF THE INVENTION

The present invention relates to measurement and maintenance systems generally and to computerized measurement and maintenance systems in particular.

BACKGROUND OF THE INVENTION

Businesses which have equipment therein typically have a maintenance schedule for maintaining the equipment. For some businesses, the maintenance schedule is virtually non-existent; equipment is maintained or fixed only when it fails in some way. When a critical machine fails in such a factory, the entire production process may come to a stop.

Some businesses solve this problem by performing preventive maintenance wherein they replace parts of machines at certain, predetermined intervals, whether or not the parts are close to failing. This avoids many failures. However, perfectly good parts are often unnecessarily replaced.

Other businesses have computerized their maintenance systems by using sensors, connected to computers, to measure the operation of their machines. The computers typically alert the maintenance personnel when the sensors detect a failure of some part of the machine.

Although the computerized systems detect where failures occur, easing the job of repairing the failure, the computerized systems do not generally provide a lot of warning that a failure is about to occur.

Device monitoring systems, using single or multiple sensors, are known, some of which are described in the article, "Empirical Models for Intelligent Data Validation" produced by Halliburton NUS Environmental Corporation of Idaho Falls, Id., U.S.A. The systems described in the article use reference data, collected when the device being monitored was operating as desired, to define a model of "normal device behavior". Later output data, as a result of later input signals, are compared to model output produced from the same input signals and an alert is provided if the model output does not match the real output data.

SUMMARY OF THE PRESENT INVENTION

Applicants have realized that a maintenance system ideally should indicate when a failure mode (i.e. the changes in the device which occur prior to actual failure) is developing.

It is therefore an object of the present invention to provide a measurement system and method which produce an indication of abnormal operation. When applied to a maintenance system, the measurement system and method indicate the development of a failure mode. When applied to a control system, the measurement system and method indicate movement out of an allowed region of operation.

There is therefore provided, in accordance with a preferred embodiment of the present invention, a measurement system for measuring the operation of a device. The system includes a plurality of virtual sensors defining a multi-dimensional virtual sensor space, a normal operation determiner for determining at least one region of normal operation for the device, and an abnormal condition determiner for providing a warning when the operation does not fall within the normal operation region. The region is defined within the multi-dimensional virtual sensor space.

Additionally, in accordance with a preferred embodiment of the present invention, the region can be defined as at least one quantized region around a datapoint within the multi-dimensional virtual sensor space. The datapoint describes one state of a normally operating device.

Alternatively, in accordance with a preferred embodiment of the present invention, the system includes an operation space definer for defining a reduced dimension operation space from the multi-dimensional virtual sensor space. Datapoints of the virtual sensor space describing one state of a normally operating device are stored. The region is defined as a collection of distances of the datapoints from the axes of the operation space.

Moreover, in accordance with a preferred embodiment of the present invention, the virtual sensors comprise physical sensors and computed sensors, wherein the computed sensors are sensors whose output is a function of output of at least one physical sensor.

There is also provided, in accordance with a preferred embodiment of the present invention, a maintenance system for maintaining at least one device. The maintenance system includes a measurement system for measuring the operation of the device and for providing an indication of when the device is not operating normally and an abnormality processor for predicting, based on output of the measurement system, when the device is likely to fail. The measurement system is as described hereinabove.

Additionally, in accordance with a preferred embodiment of the present invention, the abnormality processor has stored therein a list of failure paths each having a multiplicity of nodes and determines if the abnormal condition indication falls within the nodes of the failure paths.

Moreover, in accordance with a preferred embodiment of the present invention, the abnormality processor additionally predicts when the device will fail based on which node on the failure path the indication fell and on how long it took the device to reach the node.

Furthermore, in accordance with a preferred embodiment of the present invention, the abnormality processor rebuilds the normal operation region when the indication is falsely produced.

There is also provided, in accordance with a preferred embodiment of the present invention, a method of measuring the operation of a device. The method includes the steps of a) defining a multi-dimensional virtual sensor space from output data of a plurality of virtual sensors, b) determining at least one region of normal operation for the device, and c) providing a warning when the operation does not fall within the normal operation region. The normal operation region is defined within the multi-dimensional virtual sensor space.

Finally, there is also provided, in accordance with a preferred embodiment of the present invention, a method for maintaining at least one device. The method includes the steps of a) measuring the operation of the device and providing an indication of when the device is not operating normally and b) predicting, based on output of the step of measuring, when the device is likely to fail. The step of measuring is similar to the method of measuring described hereinabove.

BRIEF DESCRIPTION OF THE DRAWINGS AND APPENDIX

The present invention will be understood and appreciated more fully from the following detailed description taken in conjunction with the drawings in which:

FIG. 1 is a block diagram illustration of a measurement system, constructed and operative in accordance with the present invention;

FIG. 2A is a graphical illustration of a quantized two dimensional sensor space, useful in understanding a first embodiment of operation of operation measurement units of the system of FIG. 1;

FIG. 2B is a graphical illustration of a two dimensional sensor space and a principal component indicating the interrelation between the two sensors, useful in understanding a second embodiment of operation measurement units of the system of FIG. 1;

Figure 3:
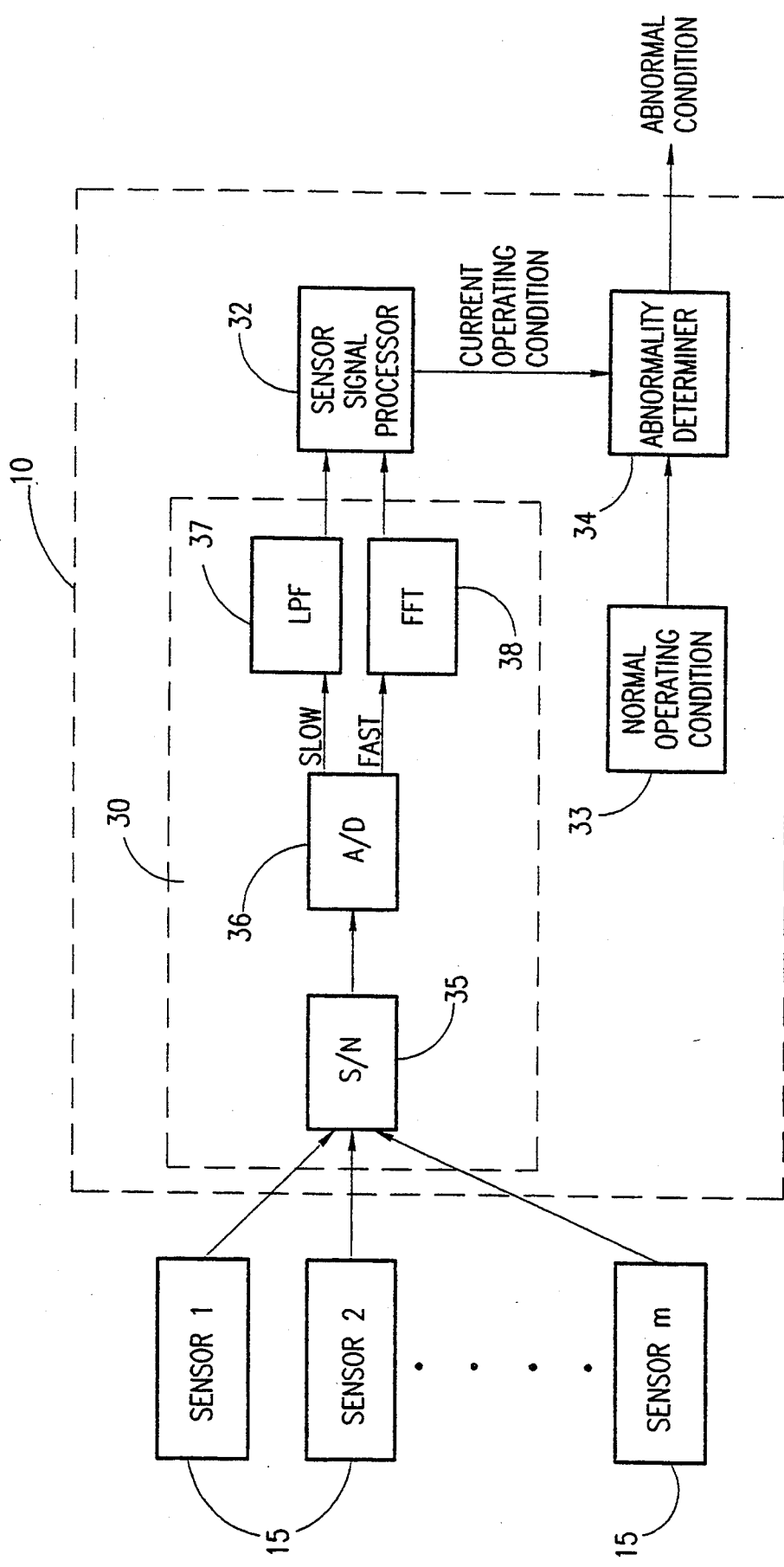
Figure 4:
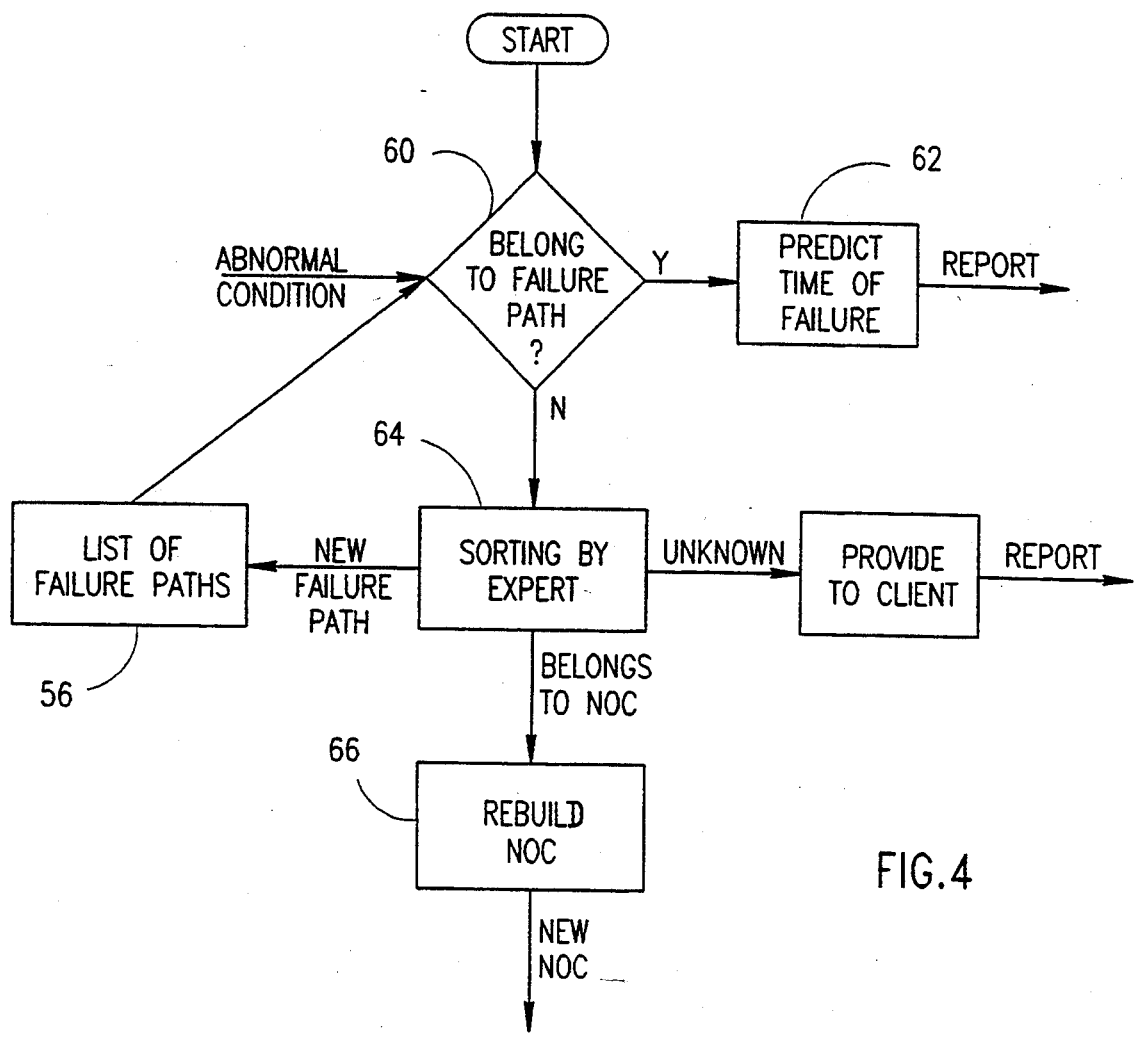
Figure 6:
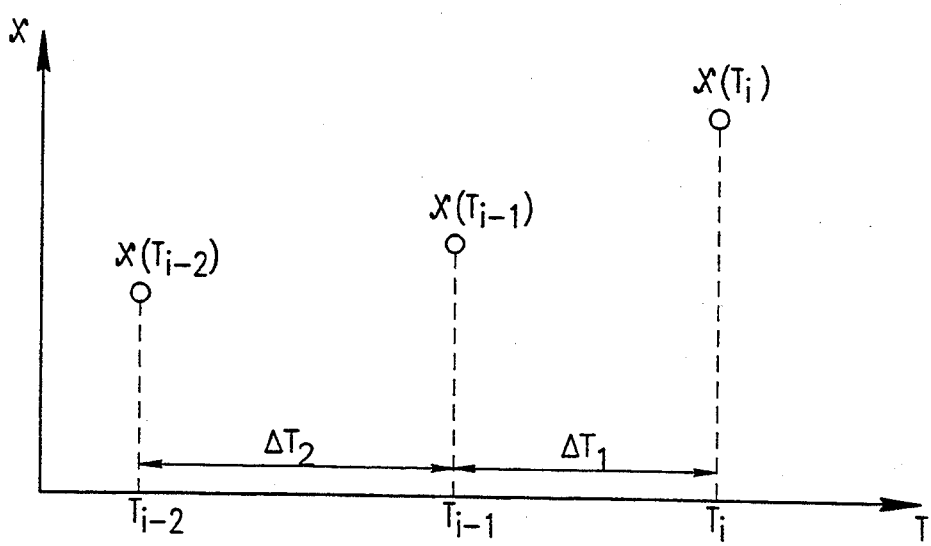
Figure 5:
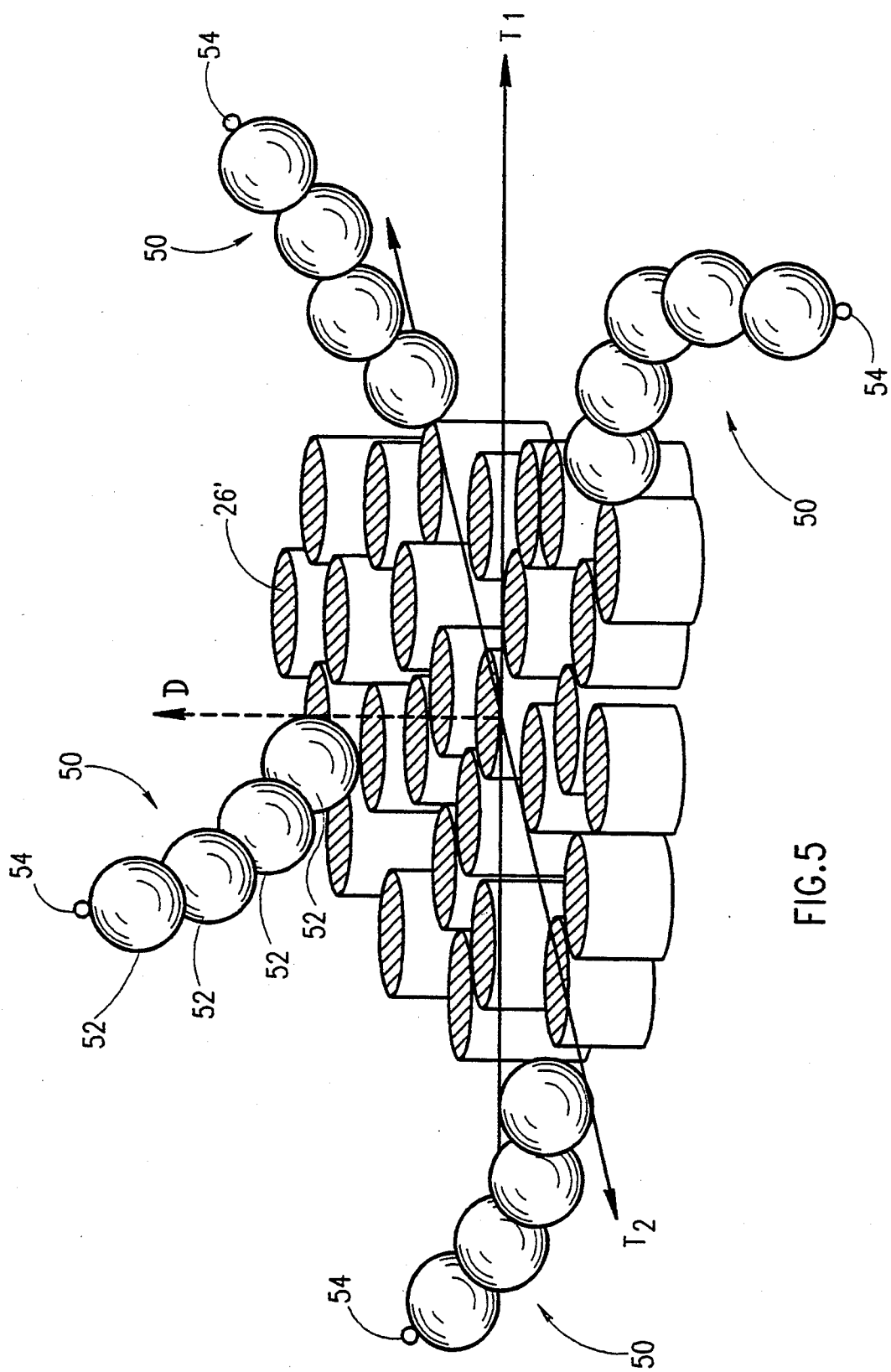

FIG. 2C a graphical illustration of a plurality of regions of normal operation, useful in understanding a second embodiment of the operation of the system of FIG. 1;

FIG. 3 is a block diagram illustration of elements of an operation measurement unit forming part of the system of FIG. 1;

FIG. 4 is a flow chart illustration of an abnormality processor forming part of the system of FIG. 1, when the system of FIG. 1 is implemented in a maintenance system;

FIG. 5 is a schematic illustration of a two-dimensional, conceptual normal operation region and a plurality of failure paths extending from it, useful in understanding the operations illustrated in FIG. 4; and FIG. 6 is a graphical illustration of position datapoints useful in understanding the prediction operation utilizing the failure paths of FIG. 5.

DETAILED DESCRIPTION OF A PREFERRED EMBODIMENT

Reference is now made to FIG. 1 which illustrates the measurement system of the present invention. As mentioned hereinabove, the measurement system can be implemented in a plurality of types of systems, including maintenance and control systems.

The measurement system typically comprises a plurality of operation measurement units 10, each monitoring the operation of one device 12 and an installer 13 for installing the measurement units 10 on its corresponding relevant device 12. For maintenance systems, the system of the present invention additionally comprises an abnormality processor 14 for determining if the device 12 is about to fail. The device 12 can be any piece of equipment, such as a fan, compressor, pump, rotating device, boiler, etc.

Connected to each measurement unit 10 are a multiplicity of sensors 15 for sensing the activity of the appropriate device 12. The sensor data is processed by the measurement unit 10, in accordance with the present invention, and, if desired, the results are provided to the abnormality processor 14.

The type of sensors 15 utilized varies according to the device 12 to be measured. For example, if device 12 is a pump, then its corresponding sensors 15 are pressure sensors measuring the input and output pressures, an input power sensor, and a current sensor sensing the input current.

The measurement units 10 typically provide information regarding the operating condition of the device 12. The information typically comprises warnings received whenever the device 12 develops an abnormal condition and alarms, similar to those provided by systems of the prior art, received whenever the device 12 has reached a failure condition.

The output of a single sensor 15 does not completely indicate the entire operation of the device 12, nor does it reflect the significant changes which occur as a failure approaches. Each sensor provides the symptoms, as it were, of the device, but not the complete operation of the device. To view the complete operation, one must view the sensor data as a whole. For the purposes of the present discussion, the "sensor data" is the output of the sensors 15 and of computed sensors whose output is computed from the output of one or more sensors 15. The total number of "virtual sensors" (i.e. sensors and computed sensors) is M.

In accordance with the present invention, the measurement system defines the normal mode of operation as a region or regions within an M-dimensional space 20 (FIGS. 2A and 2B) of sensor output. The regions are formed from at least some of the sensor datapoints 24 produced during a plurality N of predetermined, installation operations.

Applicants present herein two embodiments, illustrated in FIGS. 2A–2C to which reference is now made, for defining the normal mode of operation, it being understood that other embodiments which define the normal mode of operation within an M-dimensional space are also included within the scope of the present invention.

The first embodiment is illustrated two-dimensionally in FIG. 2A. The axes of FIG. 2A are the output of two sensors $X_1$ and $X_2$. Each axis is quantized to a desired quantization level, where, in FIG. 2A, the quantization is noted by hatch marks 22.

The quantization breaks the space 20 into a plurality of M-dimensional "cubes" 23 in some of which, labeled 25, are located a datapoint 24 from the installation operations. In accordance with this embodiment, the cubes 25 which have datapoints therein are defined as the regions of the normal operation condition.

If a datapoint 24 produced during regular operation falls within one of the regions 25, then it indicates that the device 12 is operating normally. Otherwise, device 12 is operating abnormally and the measurement unit 10 produces a warning, called herein an "abnormal condition".

It is noted that the datapoints 24 are often redundant (i.e. the M virtual sensors provide less than M pieces of information). Therefore, in accordance with a second embodiment of the present invention, illustrated for two-dimensions in FIGS. 2B and 2C, the operation of the device 12 is extracted from the output of the M virtual sensors and is used to determine a single region of normal operation.

To do this, a reduced operation space of K separate, uncorrelated (i.e. orthogonal) bits of information is first determined. The datapoints 24 are then defined within the operation space, producing thereby a "normal operation region" (NOR) within the reduced operation space. All future sensor data are transformed to the operation space and compared to the NOR.

The operation space is determined in accordance with the principles of Principal Component Analysis (PCA), described in the article by MacGregor, J. F. et al. in the article, "*Multivariate Statistical Methods in Process Analysis and Control*", Fourth International Conference on Chemical Process Control, South Padre Island, Tx., 1991. The calculations for a two sensor system are illustrated in FIGS. 2B and 2C.

PCA involves computing a minimum number K of orthogonal basis vectors $P_i$ from the M-dimensional sensor space, wherein the basis vectors capture the operation of the device 12. FIG. 2B shows a plane of the output of two sensors $X_1$ and $X_2$ and a basis vector $P_1$ which indicates the operation of the device 12.

The NOR 26 is defined by determining, for each datapoint 24, the distance D from it to its projection $T_i$ on each basis vector $P_i$. It is noted that the distances D are functions of the projections $T_i$ and only the largest value of $D(T_i)$ for each value of $T_i$ is stored. The resultant collection of distances $D(T_i)$ describes the normal operating condition of the device 12 within the K-dimensional basis vector space. The NOR 26 of the device 12 is the region defined by $D(T_1)$, the axes $T_i$ and the observed limits of $T_i$ abstracted from virtual sensor data. If desired, the collection of distances $D(T_i)$ can be modeled by an R order polynomial.

It will be appreciated that the distances $D(T_i)$ represent the locations of the measured datapoints 24, but in a more compact and useable format. Thus, NOR 26 can also be defined as the region bounded by those datapoints 24 selected to be part of $D(T_i)$.

During regular operation, each measurement unit 10 calculates distances $D(T_i)$ for each datapoint received and determines whether or not the results fall within the NOR 26. If not, a warning is provided.

If, after a warning has been received, it is determined that the abnormal datapoint in fact, is not abnormal (i.e. it is an allowed sensor value which was not measured during the initial installation operations), the basis vectors $P_1$ and the NOR 26 must be recomputed with the new datapoint.

Reference is now made back to FIG. 1. For maintenance systems, the measurement units 10 communicate with the abnormality processor 14. The communication can occur through a direct connection to the abnormality processor 14 or, if the abnormality processor 14 is located a significant distance from the measurement units 10, each measurement unit 10 can have a transmitter 16 which transmits data to a receiver 18 located on the abnormality processor 14. Alternatively, the abnormality processor 14 and measurement unit 10 can be formed into a single unit placed onto or near the device 12 to be monitored.

The abnormality processor 14 sorts the abnormal conditions received from the measurement units 10 into three categories, (1) part of an already known failure path where each path ends in a different type of failure, (2) to be added to the NOR 24, or (3) an unknown failure probably due to some external, non-maintenance related, phenomenon.

If the abnormal condition is part of a known failure path, the processor 14 typically provides an indication of the type of expected failure and a prediction of time to failure. Thus, a factory using the maintenance system of the present invention only has to repair those devices 12 which are likely to fail within a short period of time, and, the repair operation can be scheduled so that it does not interfere with the activity of the factory. Similar devices 12 in the factory which are still operating "normally" are not taken out of production during the repair operation.

Since the abnormality processor 14 receives abnormal condition information from a wide range of devices 12, often located within a plurality of factories, the failure prediction is generally more accurate than that produced based only on the abnormal conditions and failures of the devices 12 in a single factory.

The installer 13 stores data regarding each type of device 12 monitorable by the system. The data includes:
  (1) a list of sensors 15 required for the device 12;
  (2) instructions as to how to connect the sensors 15 to the device 12;
  (3) the definitions of the computed sensors; and
  (4) a list of installation operations to be performed in order to define the NOR 26.

The installer 13 also determines the NOR 26 from the datapoints 24 of the installation operations. It is noted that the installation operations can be performed one right after each other. Alternatively, the installer 13 can collect data only when the device 12, as part of its regular operations, performs one of the installation operations.

Reference is now made to FIG. 3 which illustrates the elements of one measurement unit 10. Each unit 10 typically comprises an input processor 30, a sensor signal processor (SSP) 32, a storage unit 33 for storing the "normal operating condition" (NOC) comprised of the basis vectors $P_i$ and the NOR 26 and an abnormality determiner 34 for determining if the current operation is within NOR 26.

The input processor 30 typically performs initial processing of the signals from the sensors 15. Processor 30 typically comprises a filter 35 for improving the signal-to-noise ratio of the signals from the sensors 15 and an analog-to-digital (A/D) converter 36 to convert the typically analog signals to digital data. The A/D converter 36 typically samples the signals at a high sampling rate, such as 10 KHz.

The input processor 30 additionally comprises a filter 37 for computing the stationary parameters of the slower signals and a fast Fourier transformation unit (FFT) 38, operating on the faster signals for providing information regarding the energy of the data over the frequency band. The FFT unit 38 can produce the amplitude values for selected frequencies, such as multiples of the speed of revolution of the device, or it can produce values for the energy within selected frequency bands. For later calculations, the output of the FFT unit 38 for each frequency or frequency band is considered a separate virtual sensor.

Filter 37 can be any appropriate filter, such as a Butterworth low pass filter having a cutoff frequency of mhz. For maintenance systems, FFT unit 38 typically operates once every 20 seconds on a window of approximately 1 second long. Its output is provided to the SSP 32.

The SSP 32 typically normalizes the sensor data so that all signals are defined in the same non-dimensional units. Furthermore, the SSP 32 typically converts the sensor output to a virtual sensor space, where, as mentioned hereinabove, each virtual sensor is either the same as one of the sensors 15 or a computed version of the output of one or more sensors 15. The output of the computed sensors indicate known, but unmeasurable, relationships among the real sensors 15.

For example, a computed sensor might be one of the amplitudes or energy values produced by the FFT unit 38. In another example, a computed sensor might be the pressure head H developed by a pump in response to the power P supplied to it. The pressure head H and power P are related by the function: $H = A + B*P - C*P^2$, where the values for A, B and C are specific to each device 12 being monitored. Each relationship may have a tolerance associated therewith.

The abnormality determiner 34 determines whether or not each virtual sensor datapoint, received from the SSP 32, falls within the region or regions of the NOR 26. If not, it provides a warning, indicated on FIG. 3 as an "abnormal condition".

For the first embodiment, the determination involves determining that the new virtual sensor datapoint is quantized to one of the regions 25 of the NOR 26. For the second embodiment, abnormality determiner 34 calculates the distance D of the new virtual sensor datapoint from the basis vectors $P_i$ and determines whether or not the distance D is smaller, for the same value of $T_i$, than the value of $D(T_i)$ which forms part of the NOR 26.

In either case, when an abnormal condition exists, the abnormality determiner 34 provides, on output, the datapoints of the virtual sensors and the location of each datapoint within the M-dimensional space. For the second embodiment, the distance $D(T_i)$ is also provided.

The operations of the abnormality determiner 34 are described in more detail hereinbelow.

Reference is now made to FIGS. 4 and 5. FIG. 4 illustrates, in flow chart format, the operations of the abnormality processor 14. FIG. 5 illustrates a conceptual generic NOR, labeled 26', and a plurality of failure paths 50 extending from it, useful in understanding the operation of the abnormality processor 14.

The axes in FIG. 5 are D and two projections $T_1$ and $T_2$. The NOR 26' is shown as a collection of cylinders $D(T_1,T_2)$. The NOR 26' is typically a generic NOR 26, constructed from "good" NORs of a plurality of similar devices. The data from the "good" NORs are scaled, standardized and merged in the process of constructing NOR 26'.

Each failure path 50 ends in a type of failure, such as a broken axle, a serious leak in a pipe, etc. The path itself represents the abnormal conditions the device 12 passes through as the condition which eventually causes the failure develops. The final, failure condition, labeled 54, is a single point or region.

In FIG. 5, the abnormal conditions are represented as $K+1$-dimensional spheroids 52. The failure paths 50 are represented mathematically as fuzzy sets and the spheroids 52 are represented as nodes. Each spheroid 52 is expressed as a membership function, with its center having an association membership of 1 (100% likely that the center is the current failure state), decreasing to 0 as a function of the distance from the center.

The failure paths 50 can be determined in any of a number of ways. Experiments can be performed in which the device is caused to fail in a desired way within a short period of time. At given intervals, the abnormal conditions produced by the measurement unit 10 are stored, as is the final condition. The experiment is repeated a number of times, thereby to produce a plurality of abnormal conditions at each interval of time. Each spheroid 52 is then a fuzzy node representing the range of abnormal conditions received at one interval of time.

Alternatively, a failure path can be determined in the course of operating with the measurement system of the present invention. Every time an unknown abnormal condition occurs, it and the expected failure are converted to the generic NOR 26' and saved. Once a failure path 50 has been fully determined for a given failure, the trajectory defined by the abnormal conditions on the path is divided into a small number of interval points, wherein each point defines the center of a spheroid 52. Each abnormal condition on the path is then associated with a spheroid 52 in accordance with fuzzy logic.

If desired, an operator-estimated time-to-failure can be requested for each abnormal condition on the failure path 50. The operator-estimated time-to-failure of each spheroid 52 is the average of the estimated times-to-failure of the abnormal conditions which comprise the spheroid 52. The operator-estimated times-to-failure can be utilized for failure prediction.

The generic failure paths 50 are formed of ordered lists of the nodes (spheroids 52). To be useful, the failure paths 50 are transformed into the specific PCA axes $P_1$ for each device 12. The transformed failure paths, for each device, are stored in a list 56 and are utilized by the abnormality processor 14, as described hereinbelow.

When a new abnormal condition is received from one of the measurement units 10, it is first tested, in step 60, against each known failure path 50 in the list 56. This involves computing the membership function for each node as a function of the new abnormal condition. The node with the highest association membership value is defined as the node to which the new abnormal condition belongs.

For the three-dimensional space shown in FIG. 5, the membership function M is defined in equation (1) below, where the location of the new abnormal condition is $(T_1,T_2,D)$, the center of the node is $(T^{ij}_1, T^{ij}_2, D^{ij})$ and the size of the node is defined by a tolerance defined as $(T^b_1, T^b_2, D^b)$.

$$M^{ij}(T_1,T_2,D) = e^{\frac{-(T_1-T^{ij}_1)^2}{2sig1^2}} \, e^{\frac{-(T_2-T^{ij}_2)^2}{2sig2^2}} \, e^{\frac{-(D-D^{ij})^2}{2sig3^2}} \quad (1)$$

where:

$$sig_1 = (T^b_1 - T^{ij}_1)/Z \quad (2)$$

$$sig_2 = (T^b_2 - T^{ij}_2)/Z \quad (3)$$

$$sig_3 = (D^b - D^{ij})/Z \quad (4)$$

$Z = 1.96$

The device 12 which is developing a failure, the failure being developed and an estimated time-to-failure are typically provided to the maintenance personnel responsible for the device 12 so that they can repair the device, as necessary.

The estimated time-to-failure can be determined in any number of ways. It can simply be the operator-estimated time-to-failure associated with the node. Alternatively, the time-to-failure can be estimated based on the speed with which the device passes along a failure path 50.

Once the device 12 has produced abnormal conditions belonging to three neighboring nodes 52 on a failure path 50, the velocity and acceleration of the device 12 along the failure path 50, as functions of the projections $T_i$ or the distance D, can be determined using backward difference formulae. Equations of motion can then be utilized to determine the time to failure, since the location of the final failure point or region is known. The specific equations are provided in hereinbelow beginning with Equation 14.

If the new abnormal condition is not on a failure path, in step 64 it is sorted by an expert into one of three cases, part of a possible new failure path, an abnormal condition which should be part of the NOR 26, or some unknown failure which probably is due to an external, non-maintenance related cause, such as lack of gas in a compressor, lack of power, etc. In the cases of a new failure path or an externally caused failure, the system of the present invention apprises the maintenance personnel of the problem and the maintenance personnel, after defining the problem based on their experience, indicate the source of the abnormal condition and based on that information, the abnormal condition is sorted.

The expert can be anyone who understands how the devices 12 which are being monitored operate. Since the expert sorts abnormal conditions from many types of devices 12 and many devices 12 of one type, he should be able to identify failure paths for one type of device based on failure paths seen on other types of devices.

If the new abnormal condition is a false alarm and, in reality, indicates normal operation, the NOC (i.e. the basis vectors $P_i$ and the NOR 26) must be recomputed (step 66) and then stored in the storage unit 33 of the relevant measurement unit 10. The recomputation can be performed either by the abnormality processor 14 or by the installer 13.

Other methods of processing abnormality and predicting failures are possible and are included within the scope of the present invention.

The installer 13 is utilized for all types of measurement systems and is operative to set up the measurement unit with the definitions of the computed sensors and to create the initial NOC.

Initially, the installer 13 inputs the computed sensor definitions and defines the NOR 26 as having no points. The device 12 then performs the installation operations, either at once or over time. The measurement unit 10 attached to the device 12 operates and, since the NOR 26 is 0, produces abnormal conditions for the entirety of datapoints received from the device 12.

An expert, such as the one described hereinabove for the abnormality processor 14, sorts the abnormal conditions thus produced. In most cases, he will define each of them as being part of the normal operating condition of the device 12.

Once abnormal conditions from all of the installation operations have been received and sorted, the basis vectors $P_i$ and the NOR 26 are generated and then stored in storage unit 33 of measurement unit 10.

It is envisioned that, after many thousands of one type of device 12 have been operated with the measurement system of the present invention, a few, selectable normal operating conditions will be fully described. The selected normal operating condition will then be stored in storage unit 33 without the need to perform the installation operations and receive their results.

It is noted that, if a sensor fails, the basis vectors $P_i$ and NOR 26 have to be recomputed. In this situation, the original N observations are utilized but for only M-1 sensors. The recomputation can be performed either by installer 13 or by abnormality processor 14.

The normal operation condition is calculated by the abnormality processor 14 and the installer 13 as follows:

The N data points for each of the M sensors is collected into M raw data vectors, V. The data is then standardized:

$$V_{ij} = \frac{V_{ij} - V_{ij,mean}}{std\_dev(V_{ij})}, j = 1 \ldots M, i = 1 \ldots N \quad (5)$$

and stored in a (N×M) matrix X. The matrix X is then copied into a matrix Y of the same dimensions. A matrix Xhat holding the current representation of the data as modeled by the Principal Component Analysis is initialized to 0.

A (M x M) matrix A is formed according to:

$$A = Y^T Y \quad (6)$$

The largest eigenvalue and its corresponding eigenvector, which is the principal component, $P_k$, are calculated. Since A is symmetrical, the tridiagonal form of A is calculated by Householder reduction and the first iteration of the QL algorithm is used to yield $P_k$. The details of the QL algorithm are described on pages 350-363 of the book Numerical Recipes by Press, W. H. et al, Cambridge University Press, 1986.

The vector of projections $t_k$ of the N datapoints on the k' th principal component $P_k$ are computed:

$$t_k = X P_k \quad (7)$$

The model Xhat is recomputed:

$$X\_hat = X\_hat + t_k P_k^T \quad (8)$$

The average squared prediction error SPE, defining how well the model matches the datapoints, is calculated:

$$SPE = (1/MN) * (sum(X_{ij} - Xhat_{ij})^2) \quad (9)$$

where the sum is for i from 1 to N and j from 1 to M. If the value of SPE is less than a predetermined value, then the k principal components already computed are sufficient to describe the N datapoints. If not, the information in the working matrix Y which is modeled by the k'th principal component is removed, as follows:

$$Y = Y - t_k P_k^T \quad (10)$$

The variable k is increased by 1 (i.e. k=k+1) and the above steps are repeated, beginning from equation 7.

Once all the principal components have been determined, the resultant PCA model is:

$$X\_hat = t_1 P_1^T + t_2 P_2^T + \ldots + t_k P_k^T \quad (11)$$

The distances D and scores T have to be determined, as follows:

$$D_i = sum(X_{ij} - X\_hat_{ij})^2, j = 1 \ldots N \quad (12)$$

$$T_{ij} = X P_j, j = 1 \ldots k, i = 1 \ldots N \quad (13)$$

Each point $D_i$ is a function of the scores $T_{ij}$ along each principal component.

It will be appreciated that the normal operating region is the collection of values $D(T_i)$. Generating an equation of motion. The current velocity and acceleration vectors can be estimated using past data using backward difference formulae. For example, using the three data points shown in FIG. 6, discrete approximations for $\dot{\chi}$ and $\ddot{\chi}$, particular components of the velocity vector $$\frac{d}{dt} [T_1, T_2, D]^T$$

and of the acceleration vector $$\frac{d^2}{dt^2} [T_1, T_2, D]^T$$

can be derived in terms of point wise information of the component x of the vector $[T_1 T_2 D]^T$ $$\dot{\chi}(t_i) \approx \frac{\Delta T_1}{\Delta T_2 (\Delta T_1 + \Delta T_2)} \left( \left[ \frac{(\Delta T_1 + \Delta T_2)^2 - \Delta T_1^2}{\Delta T_1^2} \right] \chi(t_i) - \left[ \frac{(\Delta T_1 + \Delta T_2)^2}{\Delta T_1^2} \right] \chi(t_{i-1}) + \chi(t_{i-2}) \right) \quad (14)$$

$$\ddot{\chi}(t_i) \approx \frac{2}{\Delta T_2 (\Delta T_1 + \Delta T_2)} \left( \frac{\Delta T_2}{\Delta T_1} \chi(t_i) - \left[ \frac{\Delta T_1 + \Delta T_2}{\Delta T_1} \right] \chi(t_{i-1}) + \chi(t_{i-2}) \right) \quad (15)$$

Note that if $\Delta T_1 = \Delta T_2 = \Delta T$ these equations simplify to:

$$\dot{\chi}(t_i) \approx \frac{3\chi(t_i) - 4\chi(t_{i-1}) + \chi(t_{i-2})}{2\Delta T} \quad (16)$$

$$\ddot{\chi}(t_i) \approx \frac{\chi(t_i) - 2\chi(t_{i-1}) + \chi(t_{i-2})}{\Delta T^2} \quad (17)$$

Using these approximations, the velocity and acceleration for changes in $T_1, T_2$ and D can be estimated. For each of these, an equation of motion can be formulated and solved in order to describe the motion along the failure trajectory in $(T_1$-$T_2$-$D)$ space. Since the current position along the failure branch and the failure point are known, the equation of motion can be used to predict the time of intercept with the failure point. For a given component (i.e. one of $T_1, T_2$ or D) with local velocity and acceleration estimated as above, $\dot{\chi}(t_i)$ and $\ddot{\chi}(t_i)$, we can write the distance covered after time $t_i$ which will be given by the equation:

$$\chi(t - t_i) = \frac{\ddot{\chi}(t_i)(t - t_i)^2}{2} + \dot{\chi}(t_i)(t - t_i) \quad (18)$$

Solving for time-of-failure. If the distance to the failure level of the component is X, then the time to failure can be derived from equation (18), namely:

$$\tau_{f2}(i) = t_i + \frac{-\dot{\chi}(t_i) \pm \sqrt{\dot{\chi}^2(t_i) + 2\ddot{\chi}(t_i)X}}{0.5\ddot{\chi}(t_i)} \quad (19)$$

If, for a given component, the discriminant (the term in the square root) is negative, which could occur if the acceleration is negative and sufficiently large, then it is possible that the failure level may not be reached by that component. If the acceleration term is positive, the failure level will always be reached at some time and equation (19) will give a non-zero answer:

$$\tau_{f2}(i) = t_i + \frac{\sqrt{\dot{\chi}^2(t_i) + 2\ddot{\chi}(t_i)X} - \dot{\chi}(t_i)}{0.5\ddot{\chi}(t_i)} \quad (20)$$

Either of the two methods proposed will predict the intercept with the known failure point (or line, or group). This is $\tau_{f2}(i)$, which was recorded at time $t = t_i$. The reported failure estimate at time $t = t_i$ should be quantified by confidence limits. Since we would expect that failure time estimates will become more accurate with time, it makes sense to use a moving buffer of estimated failure times in order to compute the standard deviation statistic. Thus we define the size of this buffer, $n_b$. The i'th average estimated time of failure $\overline{\tau}_{f2}(i)$ can be computed:

$$\overline{\tau}_{f2}(i) = \frac{\sum_{j=0}^{n_b-1} \tau_{f2}(i - j)}{n_b} \quad (21)$$

It is not the recommended measure to use, since it will be strongly influenced by early estimates, which are in general less reliable. However, it can be used to compute the standard deviation of the failure time estimate:

$$\sigma_{\tau_{f2}}(i) = \sqrt{\frac{\sum_{j=0}^{n_b-1} (\tau_{f2}(i - j) - \overline{\tau}_{f2}(i))^2}{(n_b - 1)}} \quad (22)$$

The standard deviation can be used to delineate the estimated time of failure. As in the lower level algorithm, the time-of-failure estimate can then be stated as:

$$\tau_f(t_i) = \tau_{f2}(t_i) \pm 3 \cdot \sigma_{\tau_{f2}}(t_i) \quad (23)$$

where the estimate is bounded by 95% confidence limits. Clearly, it is important to establish rules which will govern when to publicize the estimate. One set recommendations can summarized as follows:

"If the uncertainty margins are more than 30% of the estimate itself (i.e. the standard deviation is more than 10% of the estimate), do not publicize the estimate".

It will be appreciated by persons skilled in the art that the present invention is not limited to what has been particularly shown and described hereinabove. Rather the scope of the present invention is defined only by the claims which follow:

We claim:

1. A measurement system for measuring the operation of a device, the measurement system comprising:
   a plurality of virtual sensors wherein ranges of output from said plurality of virtual sensors define a multi-dimensional virtual sensor space;
   a normal operation determiner, coupled to said plurality of virtual sensors at least during installation, for defining at least one multi-dimensional normal operation region from at least one datapoint within said multi-dimensional virtual sensor space, said at least one datapoint being defined from output of said plurality of virtual sensors received at least during said installation; and
   an abnormal condition determiner, coupled to said plurality of virtual sensors during a period of regular operation, for providing an abnormality indication when output of said plurality of virtual sensors during said period of regular operation does not fall within said at least one multi-dimensional normal operation region.

2. A measurement system according to claim 1 and wherein said at least one multi-dimensional normal operation region is at least one quantized region around said at least one datapoint within said multi-dimensional virtual sensor space.

3. A measurement system according to claim 1 and additionally comprising an operation space definer for defining a reduced dimension operation space from said multi-dimensional virtual sensor space, wherein said reduced dimension operation space has fewer axes than said multi-dimensional virtual sensor space.

4. A measurement system according to claim 3 and additionally comprising a region definer for defining, from datapoints within said multi-dimensional virtual sensor space said at least one multi-dimensional normal operation region as a collection of distances of said datapoints from said axes of said reduced dimension operation space.

5. A measurement system according to claim 1 and wherein said plurality of virtual sensors comprise physical sensors and computed sensors, wherein said computed sensors are sensors whose output is a function of output of at least one physical sensor.

6. A maintenance system for maintaining at least one device, the system comprising:
a region and path storage unit for storing: (i) at least one multi-dimensional normal operation region defined by at least one multi-dimensional state previously defined by an operator as indicating normal operation of said at least one device; and (ii) a list of failure paths, each failure path ending in at least one different failure and each failure path having a multiplicity of multi-dimensional nodes, wherein each multi-dimensional node is defined by a multi-dimensional abnormal operation region defined by at least one multi-dimensional state previously defined by said operator as indicating abnormal operation of said at least one device:
a measurement system comprising:
measurement means for measuring the operation of said at least one device;
comparison means for comparing output of said measurement means with said at least one multi-dimensional normal operation region and for providing an abnormality indication when said output of said measurement means does not fall within at least one of said at least one multi-dimensional normal operation region; and
an abnormality processor for determining when said abnormality indication falls within at least one of said multi-dimensional nodes of said failure paths and for predicting therefrom when said at least one device is likely to fail.

7. A maintenance system according to claim 6 and wherein said measurement means comprises a plurality of virtual sensors wherein ranges of output from said plurality of virtual sensors define a multi-dimensional virtual sensor space; and further wherein said measurement system also comprises:
a normal operation determiner, coupled to said plurality of virtual sensors at least during installation, for defining said at least one multi-dimensional normal operation region from at least one datapoint within said multi-dimensional virtual sensor space, said at least one datapoint being defined from output of said plurality of virtual sensors received at least during said installation; and
an abnormal condition determiner, coupled to said plurality of virtual sensors during a period of regular operation, for providing an abnormality indication when output of said plurality of virtual sensors during said period of regular operation does not fall within said at least one multi-dimensional normal operation region.

8. A maintenance system according to claim 7 and wherein said abnormality processor additionally comprises a predictor for predicting when said at least one device is likely to fail based on which multi-dimensional node on which of said failure paths said abnormality indication fell and on how long said at least one device took to reach said multi-dimensional node.

9. A maintenance system according to claim 7 and wherein said abnormality processor further comprises a region rebuilder operative to rebuild said at least one multi-dimensional normal operation region when said abnormality indication is falsely produced.

10. A measurement system according to claim 7 and wherein said at least one multi-dimensional normal operation region is at least one quantized region around said at least one datapoint within said multi-dimensional virtual sensor space.

11. A maintenance system according to claim 7 and additionally comprising an operation space definer for defining a reduced dimension operation space from said multi-dimensional virtual sensor space, wherein said reduced dimension operation space has fewer axes than said multi-dimensional virtual sensor space.

12. A measurement system according to claim 11 and additionally comprising a region definer for defining, from datapoints within said multi-dimensional virtual sensor space said at least one multi-dimensional normal operation region as a collection of distances of said datapoints from said axes of said reduced dimension operation space.

13. A method of measuring the operation of a device, the method comprising the steps of:
defining a multi-dimensional virtual sensor space from ranges of output data of a plurality of virtual sensors;
determining at least one multi-dimensional normal operation region from at least one datapoint within said multi-dimensional virtual sensor space, said at least one datapoint being defined from output data of said plurality of virtual sensors received at least during an installation period; and
providing an abnormality indication when output data of said plurality of virtual sensors during a period of regular operation does not fall within said at least one multi-dimensional normal operation region.

14. A method according to claim 13 and wherein said at least one multi-dimensional normal operation region is at least one quantized region around said at least one datapoint within said multi-dimensional virtual sensor space.

15. A method according to claim 13 and wherein said step of determining comprises the step of defining a reduced dimension operation space from said multi-dimensional virtual sensor space, wherein said reduced dimension operation space has fewer axes than said multi-dimensional virtual sensor space.

16. A method according to claim 15 and wherein said step of determining additionally comprises the step of defining, from datapoints within said multi-dimensional virtual sensor space said at least one multi-dimensional normal operation region as a collection of distances of said datapoints from said axes of said reduced dimensional operation space.

17. A method according to claim 13 and wherein said plurality of virtual sensors comprise physical sensors and computed sensors, wherein said computed sensors are sensors whose output is a function of output of at least one physical sensor.

18. A method for maintaining at least one device comprising the steps of:
storing: (i) at least one multi-dimensional normal operation region defined by at least one multi-dimensional state previously defined by an operator as indicating normal operation of said at least one device; and (ii) a list of failure paths, each failure path ending in at least one different failure and each failure path having a multiplicity of multi-dimensional nodes, wherein each multi-dimensional node is defined by a multi-dimensional abnormal operation region defined by at least one multi-dimensional state previously defined by said operator as indicating abnormal operation of said at least one device;
measuring the operation of said at least one device;
comparing output of said step of measuring with said at least one multi-dimensional normal operation region;
providing an abnormality indication when said output of said step of measuring does not fall within at least one of said at least one multi-dimensional normal operation region; and
verifying when said abnormality indication falls within at least one of said multi-dimensional nodes of said failure paths and predicting therefrom when said at least one device is likely to fail.

19. A method according to claim 18 and wherein said step of measuring comprises the steps of:

defining a multi-dimensional virtual sensor space from ranges of output data of a plurality of virtual sensors;
determining at least one multi-dimensional normal operation region from at least one datapoint within said multi-dimensional virtual sensor space, said at least one datapoint being defined from output data of said plurality of virtual sensors received at least during an installation period; and
providing an abnormality indication when output of said plurality of virtual sensors during a period of regular operation does not fall within said at least one multi-dimensional normal operation region.

20. A method according to claim 19 and wherein said step of verifying and predicting additionally comprises the step of producing a prediction of when said at least one device will fail based on which multi-dimensional node on which of said failure paths said abnormality indication fell and on how long said at least one device took to reach said multi-dimensional node.

21. A method according to claim 19 and wherein said step of verifying and predicting further comprises the step of rebuilding said at least one multi-dimensional normal operation region when said abnormality indication is falsely produced.

22. A method according to claim 19 and wherein said at least one multi-dimensional normal operation region is at least one quantized region around said at least one datapoint within said multi-dimensional virtual sensor space.

23. A method according to claim 19 and wherein said step of determining comprises the step of defining a reduced dimension operation space from said multi-dimensional virtual sensor space, wherein said reduced dimension operation space has fewer axes than said multi-dimensional virtual sensor space.

24. A method according to claim 23 and wherein said step of determining additionally comprises the step of defining, from datapoints within said multi-dimensional virtual sensor space said at least one multi-dimensional normal operation region as a collection of distances of said datapoints from said axes of said reduced dimension operation space.

* * * * *